United States Patent Office 3,398,192
Patented Aug. 20, 1968

3,398,192
PENTACHLOROPHENYL-TRICHLOROMETHYL IMIDE CHLORIDE
Horst Tarnow, Leverkusen, Hans Holtschmidt, Cologne-Stammheim, and Günter Unterstenhöfer, Opladen, Germany, assignors to Farbenfabriken Bayer Aktiengesellschaft, Leverkusen, Germany, a German corporation
No Drawing. Filed Oct. 27, 1964, Ser. No. 406,913
Claims priority, application Germany, Nov. 27, 1963, F 41,383
1 Claim. (Cl. 260—566)

The present invention relates to a new phenyltrichloromethyl imide chloride which has acaricidal properties, and to a process for its production.

It has hitherto not been known that substances of similar chemical structure have acaricidal effects.

It is an object of the present invention to provide a new acaricidal agent. Another object consists in providing a method for the production of the new active compound. Further objects can be seen from the following description and the examples.

It has been found that the new pentachlorophenyl-trichloromethyl imide chloride of the formula

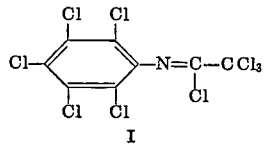

I has strong acaricidal properties.

It has also been found that the phentachlorophenyl-trichloromethyl imide chloride according to Formula I is obtained by perchlorinating an ethylphenyl-carbamic acid chloride of the formula

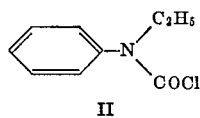

II in the presence of a halogen carrier.

It must be regarded as definitely surprising that the pentachlorophenyl-trichloromethyl imide chloride has strong acaricidal properties. The compound according to the invention is thus a valuable addition to the art.

The course of the reaction for the production of the compound according to the invention can be illustrated by the following reaction scheme:

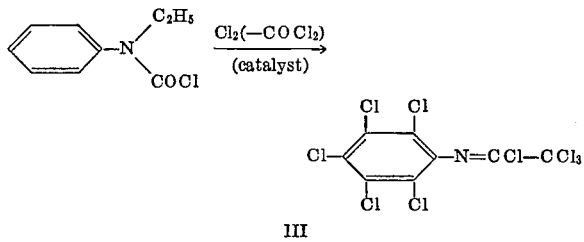

III

The perchlorination according to the invention can be carried out in the absence of solvents or, alternatively, in the presence of solvents which are resistant to chlorination. Among the latter are halogenated aromatic and aliphatic hydrocarbons such as trichlorobenzene, pentachloroethane, hexachloroethane and acetylene tetrachloride.

Suitable halogen carriers are the catalysts customarily employed for chlorination, especially iron trichloride, aluminum trichloride, aluminum tribromide, tin tetrachloride, titanium tetrachloride and boron trifluoride. It is also possible to carry out the perchlorination with simultaneous ultraviolet irradiation.

The reaction temperatures may vary within a fairly wide range. In general, the process is carried out between —20 and +280° C. preferably between 0 and 250° C. The reaction can also be effected under pressure.

When carrying out the process, the chlorine is usually employed in excess.

The compound according to the invention has strong acaricidal effects combined with a low toxicity towards warm-blooded animals and low phytotoxicity. The effects occur rapidly and long lasting. The substances can therefore be used with good results for combating mites, they are effective even against strains which are resistant to phosphoric esters.

Mites which have special significance are the spider mites (Tetranychidae), such as the common spider mite (*Tetranychus telarius*), the fruit tree spider mite (*Tetranychus pilosus*); gall mites such as the black currant gall mite (*Eriophyes ribis*) and tarsonemides, such as *Tarsonemus pallidus*.

The substances according to the invention can be used as such or in the form of the customary formulations, such as emulsifiable concentrates, spray powders, pastes, soluble powders, dusts and granulates. These are prepared in known manner (cf. Agricultural Chemicals, March 1960, pp. 35–38): Suitable auxiliaries for this purpose are mainly: solvents, such as aromatics (e.g. xylene), chlorinated aromatics (e.g. chlorobenzenes), paraffins (e.g. petroleum fractions), alcohols (e.g. methanol), amines (e.g. ethanolamine), and water; carrier substances, such as natural rock flours (e.g. kaolins, chalk) and synthetic stone powders (e.g. highly dispersed silicic acid); emulsifiers, such as nonionic and anionic emulsifiers (e.g. polyoxyethylene-fatty acid esters, alkyl-sulphones), and dispersing agents, such as lignin.

The active compounds according to the invention can be present in the formulations in admixture with other known active ingredients.

The formulations generally contain between 0.1 and 95, preferably between 0.5 and 90, percent by weight of active ingredient.

The compound according to the invention or its formulations is applied in usual manner, for example by pouring, spraying atomizing, gasifying, scattering and dusting.

To produce a suitable preparation of the active compound, 1 part by weight of the active compound is mixed with 2 parts by weight of dimethyl formamide and 1 part by weight of emulsifier and the concentrate is then diluted to the desired concentration.

Bean plants (*Phaseolus vulgaris*) which are about 30 cm. high, are sprayed with the preparation of the active compound until just dew moist. These bean plants are infested with the common spider mite (*Tetranychus telarius*) at all stages of development. In the present tests, 3 strains of *Tetranychus telarius* were treated, which differed in respect of their resistance to acaricides based on organic phosphoric esters.

Strain N=normally sensitive, strain R=mean resistance, strain S=strong resistance.

After the stated periods of time, the effectiveness of the preparation of active compound is determined by counting the dead animals. The degree of destruction thus obtained is indicated as a percentage. The concentrations of the active compound, the time of evaluation and the results obtained can be seen from the following table:

| Active substance, percent | Tetranychus telarius | | |
|---|---|---|---|
| | Strain N, percent destroyed 8$^d$ | Strain R, percent destroyed 8$^d$ | Strain S, percent destroyed 8$^d$ |
| 0.1 | 100 | 100 | 100 |
| 0.05 | 98 | 100 | 98 |
| 0.025 | 98 | 98 | 95 |

The following example is given for the purpose of illustrating the invention.

Example 242 parts by weight of N-ethyl aniline are phosgenated by the usual method. The resultant N-ethyl-N-phenyl-carbamic acid chloride is dissolved in 250 parts by weight of chloroform and initially chlorinated without irradiation at a temperature ebtween 0 and 60° C. until the reaction is no longer exothermic. Starting at a temperature of 60° C., the chlorination is subsequently continued while irridiating with ultra-violet light. The temperature is raised in such a manner that the temperature rises by 5–10° C. every hour. The chloroform is gradually driven off with the chlorine stream. After chlorinating at 200–210° C. for 5 hours, chlorination is continued for a further 6 hours in the presence of 10 g. of $FeCl_3$ or $AlCl_3$. By subsequent vacuum distillation the pentachlorophenyl-trichloromethyl imide chloride is obtained in the form of colourless crystals.

B.P. 174–175° C./0.15 mm. Hg. M.P. 131–133° C.

We claim:
1. Pentachlorophenyl-trichlormethyl imide chloride.

References Cited

UNITED STATES PATENTS 2,631,168   3/1953   Ross et al. _____ 260—570.9 X
3,190,918   6/1965   Holtschmidt _____ 260—566

OTHER REFERENCES

Holtschmidt, "Angewandte Chemie," vol. 74, pp. 848–55 (1962).

CHARLES B. PARKER, *Primary Examiner.*

R. V. HINES, *Assistant Examiner.*